US012613348B2

(12) United States Patent
Cochran et al.

(10) Patent No.: US 12,613,348 B2
(45) Date of Patent: Apr. 28, 2026

(54) DOPPLER TRACKING FOR SIGNALS OF OPPORTUNITY USING RATE-LINE DETECTION

(71) Applicant: General Dynamics Mission Systems, Inc., Fairfax, VA (US)

(72) Inventors: Bruce Cochran, Fairfax, VA (US); Ronald McCallister, Fairfax, VA (US); Steven Goisman, Fairfax, VA (US); Scott David Blanchard, Fairfax, VA (US)

(73) Assignee: General Dynamics Mission Systems, Inc., Fairfax, VA (US)

( * ) Notice: Subject to any disclaimer, the term of this patent is extended or adjusted under 35 U.S.C. 154(b) by 427 days.

(21) Appl. No.: 17/931,809

(22) Filed: Sep. 13, 2022

(65) Prior Publication Data

US 2023/0228850 A1 Jul. 20, 2023

Related U.S. Application Data

(63) Continuation-in-part of application No. 17/648,213, filed on Jan. 18, 2022, now Pat. No. 11,841,442.

(51) Int. Cl.
| | |
|---|---|
| *G01S 19/39* | (2010.01) |
| *G01S 19/25* | (2010.01) |
| *G01S 7/481* | (2006.01) |
| *G01S 19/07* | (2010.01) |

(Continued)

(52) U.S. Cl.
CPC .......... *G01S 19/396* (2019.08); *G01S 19/254* (2013.01); *G01S 7/4811* (2013.01); *G01S 19/07* (2013.01); *G01S 19/41* (2013.01); *H04B 7/1855* (2013.01)

(58) Field of Classification Search
CPC ...... G01S 19/396; G01S 19/38; G01S 19/254; G01S 19/07; G01S 19/41; G01S 19/40; G01S 19/25; G01S 5/0221; G01S 5/0246; G01S 5/02; G01S 7/4811; H04B 7/1855
USPC ........... 342/357.21, 357.22, 357.78, 357.23, 342/357.24, 357.44
See application file for complete search history.

(56) References Cited

U.S. PATENT DOCUMENTS

| | | | | |
|---|---|---|---|---|
| 5,070,338 A | * | 12/1991 | Cohen ....................... | G01S 3/58 |
| | | | | 701/13 |
| 5,629,707 A | | 5/1997 | Heuvel et al. | |

(Continued)

FOREIGN PATENT DOCUMENTS

| | | | | |
|---|---|---|---|---|
| AU | 754282 B2 | * | 11/2002 | ........... H04B 1/7093 |
| CN | 118837914 A | * | 10/2024 | ............. G01S 19/42 |

*Primary Examiner* — Chuong P Nguyen
(74) *Attorney, Agent, or Firm* — Ingrassia Fisher & Lorenz, LLP

(57) ABSTRACT

The receiver captures an electromagnetic transmission carrying a bauded signal, such as a transmission from an orbiting satellite, and processes it for Doppler shift analysis. The electromagnetic transmission is captured and a non-linear operation is performed to expose a cyclostationary feature of the captured transmission that will define a rate-line. This rate-line will exist at a frequency that is related to the bauded signal and Doppler shift relative to the motion of the transmitter to the receiver. The rate-line frequency is tracked in time to generate data indicative of a Doppler shift associated with the satellite and processed by an estimator fed by satellite propagator to supply positioning, navigation and timing services at the receiver output.

20 Claims, 8 Drawing Sheets

(51) Int. Cl.
   *G01S 19/41*         (2010.01)
   *H04B 7/185*        (2006.01)

(56)                      References Cited

U.S. PATENT DOCUMENTS

| | | | | |
|---|---|---|---|---|
| 5,874,913 | A * | 2/1999 | Blanchard ............ | H04B 7/2125 |
| | | | | 455/12.1 |
| 6,731,237 | B2 * | 5/2004 | Gustafson .......... | G01C 21/1652 |
| | | | | 342/357.65 |
| 6,873,288 | B2 * | 3/2005 | Heppe ..................... | G01S 19/22 |
| | | | | 375/E1.016 |
| 9,341,719 | B2 * | 5/2016 | Jarvis ...................... | G01S 19/24 |
| 10,215,850 | B2 * | 2/2019 | Robinson .............. | G01S 11/026 |
| 10,222,479 | B2 * | 3/2019 | Jarvis .................... | G01S 19/258 |
| 11,513,235 | B2 * | 11/2022 | Cheng .................... | G01S 19/52 |
| 11,811,432 | B2 * | 11/2023 | Edge ................. | H04B 7/18513 |
| 2019/0041527 | A1 * | 2/2019 | Gustafson ............. | G01S 19/215 |

* cited by examiner

DOPPLER TRACKING FOR SIGNALS OF OPPORTUNITY USING RATE-LINE DETECTION

CROSS-REFERENCE TO RELATED APPLICATIONS

This application is a continuation-in-part of U.S. patent application Ser. No. 17/648,213, filed Jan. 18, 2022.

TECHNICAL FIELD

This disclosure relates generally to radio frequency signal processing and more particularly to a signal processing technique for extracting Doppler shift information from cyclostationary features of radio frequency signals propagating from moving sources, such as orbiting satellites.

BACKGROUND

This section provides background information related to the present disclosure which is not necessarily prior art.

Currently, the Global Navigation Satellite System (GNSS) widely serves as the most frequently relied upon technology to provide positioning, navigation and timing services for a wide range of applications. The GNSS employs numerous constellations of satellites that broadcast accurately timed signals back to Earth. The GNSS receiver measures signal time of arrival differences among these satellites to perform triangulation. In this way, the location of the receiver can be accurately determined and used for positioning, navigation and timing.

While demonstrated to be highly effective, the GNSS is not foolproof. Satellite borne transmitters can fail and their signals can be interfered with both by jamming from intentional and unintentional human transmissions, and by space weather events, such as solar flares, coronal mass ejections, and electromagnetic impulses.

Accordingly, there is considerable interest in an alternate system for providing positioning, navigation and timing services. In this regard, the many radio frequency signals broadcast from the thousands of satellites in orbit around the Earth (not just the GNSS satellites) represent signals of opportunity. If the orbit information of these satellites is known, and the Doppler shift of their signals can be tracked, in theory it is possible to use this information to provide positioning, navigation, and timing services.

However, it can be extremely difficult to acquire and track these signals of opportunity, particularly where insufficient information about the signal payload is known to be able to decode it. During initial investigation of the signal of opportunity one might assume that the carrier frequency of the unknown satellite could be tracked, but often such is not the case. Modern satellite systems are typically designed to maximize the payload throughput, and this is frequently done by using an encoding scheme which maximizes the payload signal to noise ratio, at the expense of largely suppressing the carrier frequency. Thus if the carrier frequency is to be used for Doppler shift measurement, a significant effort in processing time is required.

To complicate matters further, these signals of opportunity often will be transmitting using encoding schemes that are difficult to detect without a priori information about how the message is encoded. In addition blind estimation techniques to extract useful tracking information from the signal payload also can take a long time, lots of processing and may ultimately prove ineffective.

SUMMARY

Compared with blind estimation, the disclosed technique can be performed virtually instantaneously. It works by detecting a cyclostationary feature of the signal of opportunity, such as a modulated frequency or code chipping rate, and then tracking that detected feature to measure its Doppler shift. The Doppler shift information is then readily useable by a receiver to provide positioning, navigation and/or timing services.

In addition to being extremely fast, the disclosed cyclostationary feature detection is possible even in cases where the broadcast signal itself is well below the noise floor.

The disclosed technique works well with virtually all orbiting satellites that exhibit Doppler shift relative to the receiver (e.g. relative to ground-based receivers) and can be applied to any bauded signal.

In accordance with one aspect, a receiver is disclosed for processing an electromagnetic transmission carrying a bauded signal from a transmitter carried by a satellite that is in motion relative to a tracking receiver. The apparatus includes an antenna port for capturing the electromagnetic transmission. Coupled to this port is a processor configured to perform a non-linear operation on the captured transmission to expose a cyclostationary feature of the captured transmission that defines a rate-line having a rate-line frequency that is related to the bauded signal and to the motion of the transmitter relative to the receiver. A circuit or process is included which detects the rate-line frequency and generates Doppler shift data indicative of the Doppler shift associated with the satellite in motion. A satellite propagator supplies at least one of position and velocity information of the satellite. An estimator, receptive of the at least one of position and velocity information from the propagator and further receptive of the Doppler shift data, computes at least one of positioning, navigation and timing information supplied as the output of the receiver.

BRIEF DESCRIPTION OF THE DRAWINGS

The drawings described herein are for illustrative purposes only of selected embodiments and not all possible implementations. The particular choice of drawings is not intended to limit the scope of the present disclosure.

DETAILED DESCRIPTION

Figure 1:
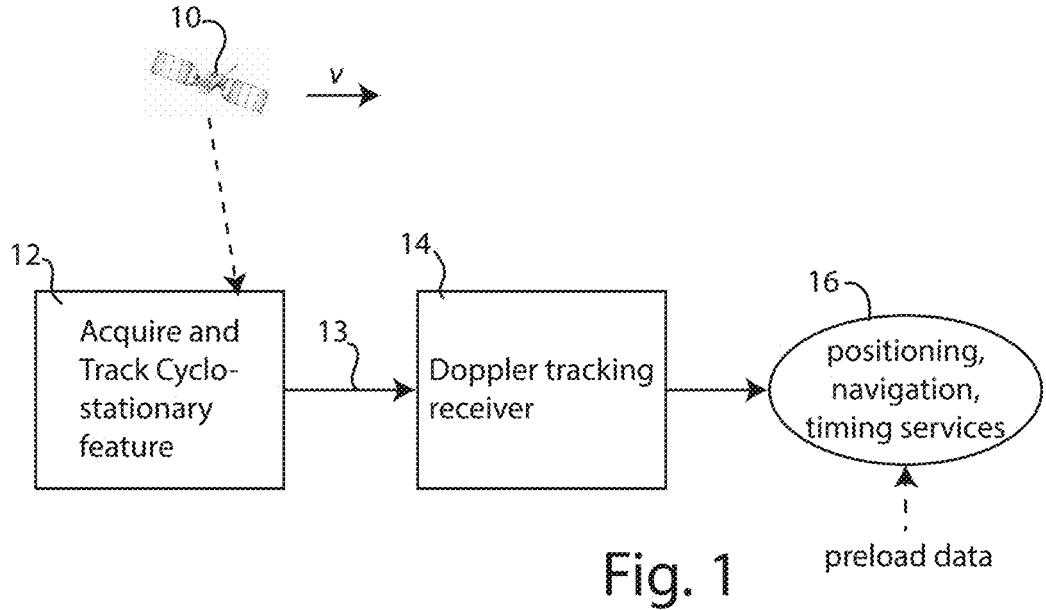
FIG. 1 is a simplified block diagram illustrating a high-level context in which the disclosed signal processing technique may be implemented.

The disclosed signal processing system and method acquires and tracks a cyclostationary feature of a satellite transmission, and generates a unique Doppler effect signal, extracted from the cyclostationary feature, which may be fed to a Doppler tracking receiver to provide positioning, navigation and timing services. FIG. 1 illustrates the basic configuration whereby the signal processing system 12 supplies this unique Doppler effect signal to the Doppler tracking receiver 14. As illustrated, a transmission from an orbiting satellite 10, or other moving object is first processed by the disclosed signal processing system 12, with the derived Doppler effect signal 13 being supplied to the Doppler tracking receiver of conventional design.

As more fully explained below, the cyclostationary feature extracted by the signal processing system 12 is not apparent in the satellite transmission spectrum ordinarily received by a Doppler tracking receiver. However, the extracted cyclostationary feature exhibits a fundamental frequency, referred to herein as the rate-line frequency, which exhibits Doppler shift and can be tracked. The fundamental frequency exhibits an apparent frequency shift (Doppler shift) because the satellite is moving across the sky with a relative velocity v as seen from a stationary ground-based receiver.

Cyclostationary Features

Cyclostationary features, although not visible in the transmission spectrum, exist in satellite and other communication systems which use a modulation encoding scheme that changes from one information state to the next using a predetermined time period for each bit of information imposed on the carrier. The rate at which the information state changes may generally be referred to as the baud rate. Some sophisticated satellite systems employ a spread spectrum encoding scheme in which a group of different carrier frequencies are sequentially used, changing from one carrier frequency to the next at some predetermined bauded time interval (referred to as the chip rate). Thus in each of these cases, the transmission can be considered a bauded signal, because the encoded information state or carrier frequency state changes at a rate determined a priori, and this encoding pattern repeats in a cyclic manner. Thus the term cyclostationary is used to describe these bauded signal encoding schemes.

It is therefore, the function of the disclosed signal processing system 12 to acquire a radio frequency signal transmission from satellite 10, extract a cyclostationary feature from the acquired signal and track changes in the cyclostationary feature as it undergoes time dilation (Doppler shift) because the satellite is moving relative to a stationary ground-based receiver. In effect the shifted frequency of the extracted cyclostationary feature provides a proxy for the Doppler shift information needed by the Doppler tracking receiver 14, which would otherwise need to rely on measuring shifts in the RF carrier frequency (often one or two orders of magnitude weaker). By supplying such robust Doppler shift information to a Doppler tracking receiver 14, the receiver is able to provide positioning, navigation and timing services 16, even in cases where the transmission carrier frequency is too weak for lock on. As noted, the Doppler tracking receiver 14 can be of any conventional design, however the source of Doppler shift information, i.e., from the disclosed signal processing system 12, is new, unique and not of conventional design.

Overview of Process

Figure 2:
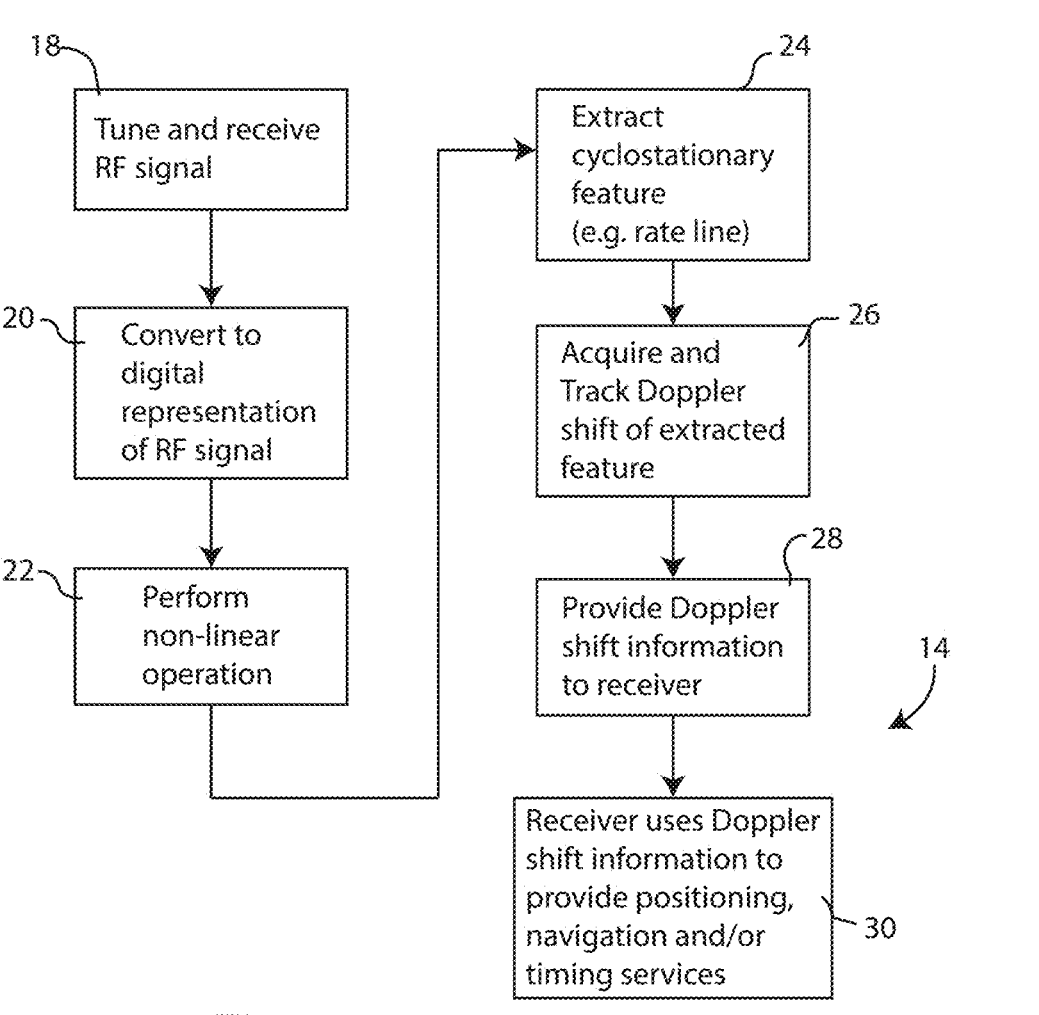
FIG. 2 is a flow chart providing an overview of core signal processing steps used to acquire and track Doppler shift of the cyclostationary feature (e.g., rate line)

FIG. 2 illustrates an overview of how the disclosed signal processing system 12 functions. As illustrated in FIG. 2, the signal processing steps may be performed upon the transmission from a single satellite, as was illustrated in FIG. 1. However, in many cases the signal processing system 12 will actually be operating on signals from a constellation or plurality of satellites. Exactly how this may be done will be described below with reference to FIG. 3.

The process begins at 18 by receiving and tuning the radio frequency transmission from one or more satellites. Receiving and tuning 18 may involve capturing the radio frequency signals using a suitable antenna and selecting a predetermined band of captured radio frequency signals, using a suitable bandpass filter. In many cases, all satellites within a given constellation may be operating on the same frequency or on a range of related frequencies. Thus a suitable filter bandwidth is chosen to capture the desired RF frequencies of interest. Of course, in cases where the precise RF frequencies are not known apriori, the bandwidth may be tuned wider or narrower, as needed, until useful information is being collected.

The captured band of RF frequency signals are then converted from analog to digital form as at 20, using a suitable analog-to-digital converter (ADC), to produce a digital representation of the RF signal(s). This digital representation may be more convenient for subsequent calculations and processing if converted to a baseband representation of the RF signal (by downsampling or other suitable process).

Next, as shown at 22, a non-linear operation is performed on the digital representation of the RF signal(s). Use of a non-linear operation produces new frequencies (i.e., in frequencies addition to those frequencies present in the RF signal(s). At least one of these newly created frequencies corresponds to cyclostationary features inherent in the broadcast RF signals from the satellite(s), but not directly visible to a conventional energy detector of the type conventionally used to detect signal strength modulations of the RF transmission. In this disclosure the newly created frequencies are characterized as rate-line frequencies, corresponding to encoding scheme timing parameters such as baud rate, chip rate or the like.

Following the non-linear operation 22, the processor extracts the newly created rate-line frequencies corresponding to the cyclostationary feature(s) of interest. To separate the rate-line frequencies from other extraneous or spurious signals and noise, additional bandpass filtering may be employed. As noted, these rate-line signals are not apparent in the transmission spectrum, but are extracted by performing the non-linear operation. In essence, this rate-line is an artificial signal, nominally existing at a frequency corresponding to a cyclostationary feature of the waveform, but capable of being Doppler shifted if the satellite which broadcast the RF signal is moving relative to the receiver.

Taking advantage of the rate-line's susceptibility to Doppler shift, the processor at 26 acquires (identifies) the rate-line signal(s) present and begins tracking any frequency shift it may exhibit over time. Such frequency shift is highly correlated to the Doppler shift produced by the motion of the satellite relative to the receiver. Once sufficient data have been collected to determine a Doppler shift value, this information is supplied at 28 to the receiver.

The receiver, at 30, then uses this newly provided Doppler shift information to compute the location of the receiver, using this Doppler shift information and knowing a priori the Two-Line element (TLE) information regarding the known locations of the broadcasting satellite constellation. A priori knowledge of the TLE information is typically supplied by downloading to the receiver, where it is maintained as a catalog of space objects orbiting the Earth.

Figure 10:
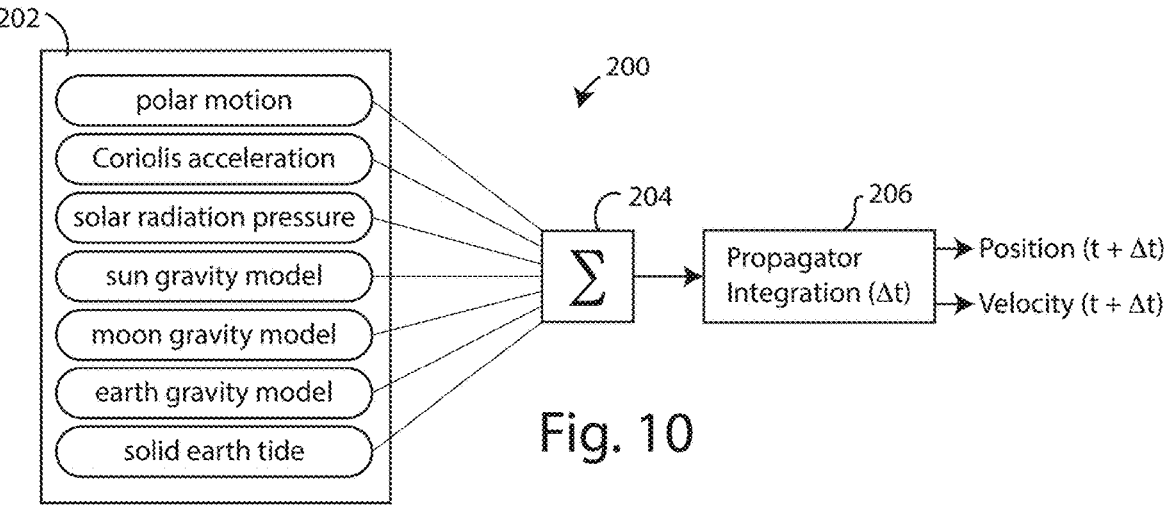
FIG. 10 is a block diagram illustrating a propagator useful in ascertaining accurate satellite position and velocity information.

A more accurate embodiment for ascertaining satellite position and vector velocity employs a high-fidelity propagator. An exemplary high-fidelity propagator 200 is illustrated in FIG. 10. The high-fidelity propagator draws upon data from a plurality of different sources 202 that affect satellite motion. The illustrated list of sources 202 is extensive, but not exhaustive. For example, passing proximity to other orbiting bodies or nearby space objects will also perturb the satellite's orbit. Essentially, each of these different perturbation sources applies a vector force upon the satellite that alters its motion to some degree. The cumulative effect of these forces, as diagrammatically depicted at 204, produces changes in satellite acceleration. The propagator integrates these changes in acceleration at 206 to computes changes in satellite position and velocity over the integration interval Δt.

The propagator computes at regular time intervals, with future position and velocity vectors stored at the receiver, where the receiver interpolates between the time intervals to estimate the satellite position and vector velocity. Suitable propagators include the Draper Semi-analytical Satellite Theory (DSST) propagator, Satellite Tool Kit (STK) Astrogator and High Precision Orbit Propagator.

While the list of sources 202 is extensive, it is not exhaustive. For example, passing proximity to other orbiting bodies or nearby space objects will also perturb the satellite's motion.

Figure 3:
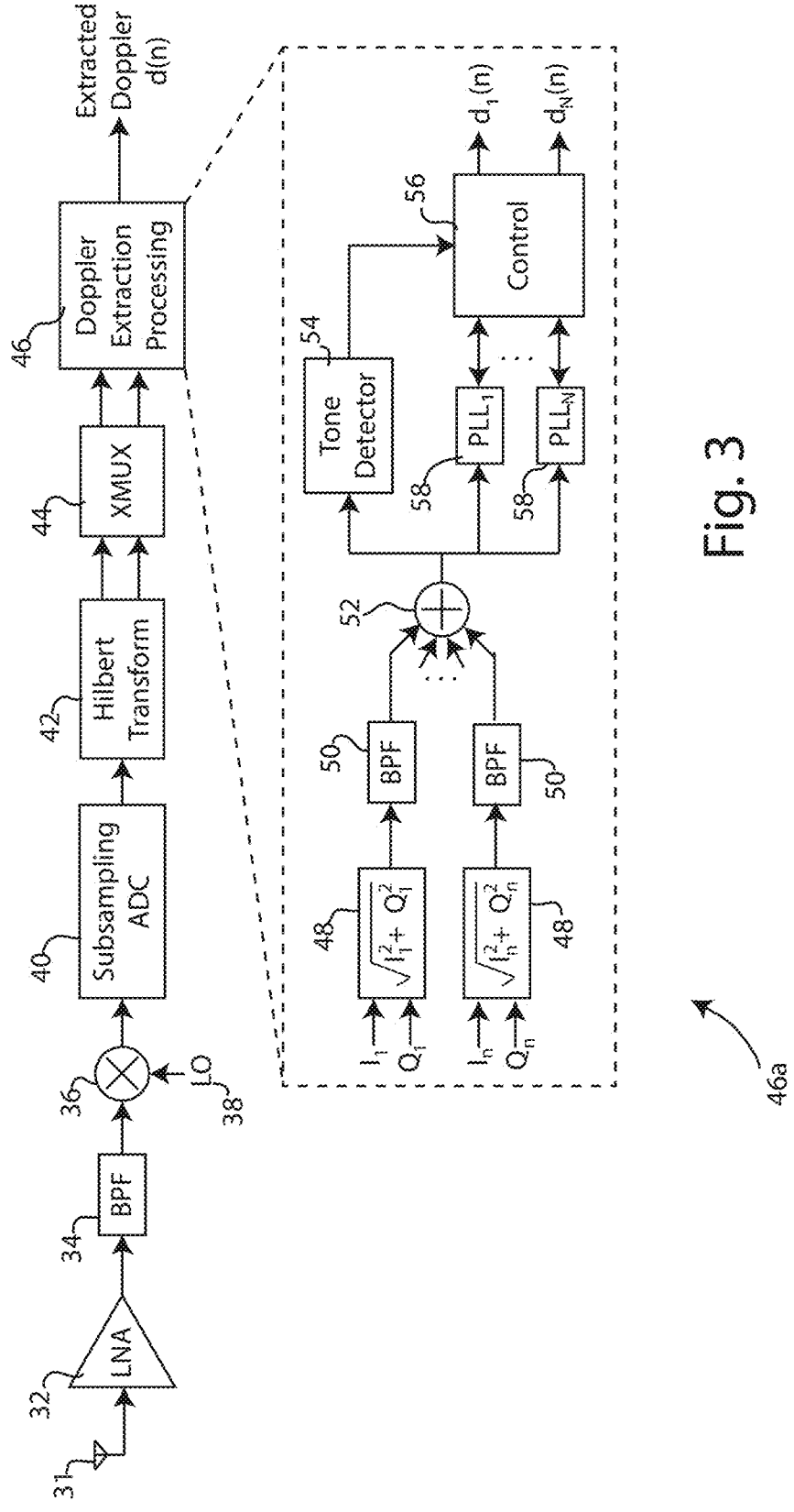
FIG. 3 is a block diagram illustrating an exemplary embodiment of the signal processing technique, useful for processing channelized signals from a plurality of satellites.
Figure 4:
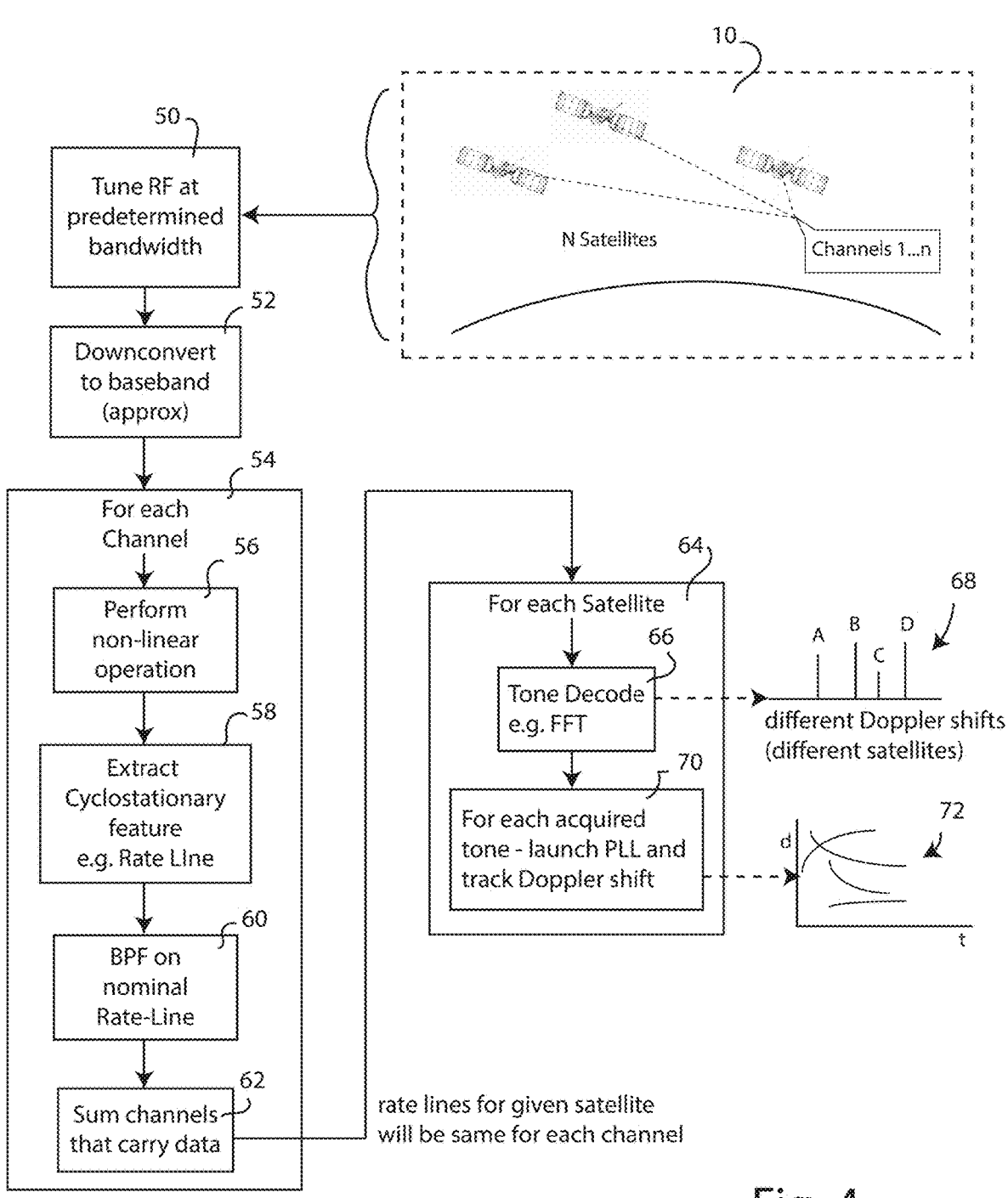
FIG. 4 is a flow chart diagram explaining the operation of the embodiment of FIG. 3.

While the above description has alluded to the fact that an exemplary embodiment will typically employ a constellation of a plurality of satellites, FIGS. 3 and 4 will now describe in detail that in many applications, not only will plural satellites be involved, but also multiple channels of information may be carried by each satellite. Thus in FIG. 4, a plurality of three satellites has been illustrated at 10, with the indication that each satellite broadcasts a signal that supports n-channels of information (channels 1 . . . n). The circuit block diagram of FIG. 3 shows how the disclosed signal processing system handles such information.

Exemplary Circuit Embodiment

Referring to FIG. 3, the receiver antenna 31 captures broadcast RF signals from all satellites within view and supplies them to a low noise amplifier 32. Having a good signal-to-noise ratio is important, so the low noise amplifier is deployed first in the signal chain. The low noise amplifier is sufficiently broadband to linearly amplify all received frequencies of interest as captured by the antenna.

Next the amplified signal is fed to bandpass filter 34, which may be designed to pass unimpeded the RF frequencies of interest, while blocking frequencies outside the range of frequencies used by the satellites of interest. For example, if the satellites provide a downlink transmission in the S-band (2-5 GHz), the passband of the bandpass filter 34 is designed to permit only that frequency range to pass. Of course, if a subset of the S-band is used, then the filter may be suitably narrowed. The purpose of the bandpass filter 34 is to improve system signal-to-noise ratio by blocking all noise signals that are outside the passband. In this regard, the sky is awash with noise, particularly during daylight hours, the Sun being one of the largest noise sources.

After bandpass filtering, the remaining signals are mixed at 36 with a local oscillator 38, which produces sum and difference heterodyne versions of the received signal. By suitably selecting (tuning) the local oscillator frequency, the difference heterodyne may be placed at or near baseband, where it is then processed by the subsampling analog to digital converter 40 to provide a digital representation of the received satellite signals. The sum heterodyne, if present, is superfluous and may be discarded.

In a practical implementation, the low noise amplifier 32, bandpass filter 34 and mixer 36 may be implemented using discrete integrated circuits, LC networks, of suitable design for handling the RF frequencies involved. After passing through the ADC 40, all of the remaining signal processing may be performed in the digital domain and thus may be implemented using gate array device (e.g., FPGA), digital signal processing integrated circuits, microprocessors or other digital processing circuits.

As noted above, one of the key processing steps in order to acquire and track a cyclostationary feature is to perform a nonlinear operation. In the embodiment illustrated in FIG. 3, this nonlinear operation is performed by converting the broadcast signal into I and Q components and then computing at 48 the vector magnitude (a non-linear operation). Other non-linear operations may also be used. In the illustrated embodiment, the I and Q components are extracted by applying a Hilbert transform 42 to the digitally sampled broadcast signal, producing two signals (I and Q signals) which are 90 degrees apart in phase. Once extracted, the I and Q signals are processed to compute the vector magnitude at 48. Alternative non-linear operations include applying a delay- and multiply operation, or applying a signal squaring operation.

The non-linear operation exposes the cyclostationary rate-line feature, producing a rate-line signal at a frequency fundamentally dictated by the bauded encoding scheme of the communication system, but altered in frequency by Doppler shift caused by the relative motion of the particular satellite making the transmission. Thus the rate-line frequency can be used as a proxy or measure of the satellite's Doppler shift and may ultimately be used to help identify which satellite is being observed. In a first illustrated embodiment, a phase-locked loop-assisted tone detector 54 measures the frequency of the rate-line. This tone detection is part of the Doppler extraction processing 46, which is shown in greater detail at 46a. As will be next discussed, a portion of the Doppler extraction processing 46 shown in FIG. 3 is designed to support multichannel broadcasts and concurrent processing of multiple satellites. (Additional embodiments using different rate-line discrimination techniques are discussed later below)

Support for Multichannel Broadcasts and Concurrent Processing of Multiple Satellites Many satellite communications systems employ a channelized communication architecture, where each satellite is capable of communicating plural message streams or payloads that are separated in some fashion. Typical channelization methods include packetizing, frequency division multiplexing and time division multiplexing. These communication architectures can be quite sophisticated. For example, an example satellite system network may use the S-band for satellite-to-user transmission (forward downlink). The utilized bandwidth is divided into plural frequency domain multiplexed (FDM) channels. Thus the channelized transmission can support different messages on each of the plural channels. Other satellite systems may use other architectures.

Currently in orbit around the Earth are thousands of satellite communications systems. Thus at any given time potentially hundreds of satellite signals will impinge on the antenna 31 of the signal processing system of FIG. 3. The satellites producing signals visible to antenna 31 are likely to be positioned at different locations across the sky and will be traveling at different relative velocities to antenna 31. Thus these satellites will quite likely exhibit different Doppler shifts.

The embodiment illustrated in FIG. 3 is thus configured to concurrently process received signals from plural satellites, and to extract rate-line information from each channel of each satellite transmission within the passband of bandpass filter 34. To do this, a transmultiplexer 44 is used, to convert the channelized information from the domain in which it was multiplexed for transmission (e.g. FDM) into a domain that can be more conveniently processed by the non-linear operation. Essentially, the transmultiplexer 44 converts from frequency domain multiplexing to time domain multiplexing. In this way the I and Q signals from each of the individual channels may be time-aligned, so that the respective rate-line frequencies of all channels are all in phase and thus capable of being meaningfully summed.

The Doppler signal extraction process 46, illustrated in more detail at 46*a*, operates on the I and Q signals from each of the individual channels. To each I and Q signal, the non-linear process 48 is performed to generate a plurality of rate-line signals. Thereafter the rate-line signals are bandpass filtered at 50 and summed at 52. The bandpass filters at 50 have filter bandwidths chosen to pass frequencies in the expected range of the rate-line frequencies associated with the satellite communication system. Summing the rate-line signals in summer 52 effectively boosts the signal strength of the rate-line signal for a given satellite by adding each channel's contribution to the collective, thereby producing a more robust representation of the rate-line for that satellite.

Of course, if signals from plural satellites are captured by antenna 31 and processed as described above, it is likely that each satellite will exhibit different rate-line frequencies, due to differences in the respective Doppler shifts. Thus the output of summer 52 can be expected to contain plural rate-line frequencies, one for each satellite. To separate these respective rate-line frequencies into data for each satellite, the frequency of each rate-line is detected by tone detector 54 and a phase-locked loop 58 process is instantiated by control processor 56 for each different frequency. The phase-locked loop 58 process, by comparing output to input, helps smooth out minor fluctuations from one reading to the next, thereby producing a stable measure of the rate-line frequency. In this way rate-line data for each satellite can be acquired and tracked over time and ultimately output as a data stream giving a different Doppler shift value $d_1(n)$ to $d_N(n)$ for each satellite. This Doppler shift data stream is then fed to the Doppler tracking receiver 14 (FIG. 1) where the information is used to provide positioning, navigation and/or timing services, as at step 30 (FIG. 2).

As noted earlier, these rate-line signals are not seen in the satellite transmission spectrum, and yet they can provide a considerably more robust measure of satellite Doppler shift. By way of example, the rate-line of an exemplary Doppler shifted satellite signal may typically be in the low MHz range, for example on the order of 1 MHz. This low MHz. rate-line tone is far below the 2500 MHz carrier frequency and thus not seen within the spectrum captured by antenna 31 and processed through bandpass filter 34. The doppler shift of both frequencies from the satellite velocity would be relative to the detected frequencies (hence the 1 MHz doppler would be approximately 2500 times less than the carrier frequency, i.e. 10 Hz doppler for 1 MHz vs. 25 KHz for carrier).

Signal Processing Steps

FIG. 4 illustrates the disclosed signal processing method, as applied to signals captured by the antenna 31 (FIG. 3). Signals in the frequency range of interest are tuned at 60, which includes employment of bandpass filter 34 (FIG. 3) to screen out signals outside the range of frequencies of interest. As shown at 10, the process is designed to work with signals captured from plural satellites, each providing a multichannel transmission.

The tuning process may also include downconverting the received signals to baseband at 62. The downconversion step may be implemented by using the mixer 36 and local oscillator 38 (FIG. 3). Downconversion allows the received signals to be more readily digitized, as by ADC 40 (FIG. 3). While downconversion has been illustrated here and in FIG. 3, given suitably fast ADC circuitry, it is possible to digitize the received RF signals directly (without mixer and local oscillator) and through such direct conversion produce the baseband data in the digital domain.

Then, for each channel of a transmission being processed, the sequence of steps shown generally at 64 are performed. Included in these steps are performing a non-linear operation 66 upon the signals from each channel. The non-linear processing may be performed by suitable computation such as computing the vector magnitude of I and Q phases of the signals for each channel, as implemented at 48 (FIG. 3) with the aid of the transmultiplexer 44 (FIG. 3).

Cyclostationary features, such as rate-line signals are extracted at 68, this being the resultant output of the non-linear operation performed at 66. Bandpass filtering is then performed at 70, using a bandpass filter (or bank of bandpass filters) 50 (FIG. 3) centered on the nominal rate-line frequency expected from the communication system's bauded signal and allowing sufficient bandwidth to pass frequencies bearing a reasonable positive or negative Doppler shift.

The resultant rate-line signals for each channel are time aligned and their amplitudes are summed at 72 to produce a collective rate-line value representing the Doppler shift exhibited by the satellite which made the channelized transmission. In this regard, the rate-lines for any given satellite will be the same for each channel within the transmission, because the transmitter producing the channelized transmission is onboard the moving satellite and thus inherits its Doppler shift.

In the case where signals from plural satellites are captured by antenna 31 (FIG. 3), the steps shown generally at 74 are performed for each satellite. These steps include decoding the frequency (tone) of each set of channelized rate-lines. Such decoding may be performed using a Fast Fourier Transform (FFT). Such tone decoding will likely produce several different rate-line frequencies, as the frequencies are Doppler-shift-dependent and the plurality of satellites will quite probably exhibit different velocities relative to the ground-based receiver. An exemplary frequency plot of different rate-lines is shown at 78, as rate-lines A, B, C and D.

For each decoded rate-line tone, the process instantiates or launches a frequency tracking process, such as a phase-locked loop process 58 (FIG. 3) which will track the rate-lines over time, as illustrated at 82. As illustrated at 82, the individual Doppler shift frequencies may change over time as a particular satellite moves toward and then away from the ground-based receiver.

Exemplary Signals Corresponding to Signal Processing Steps

Figure 5:
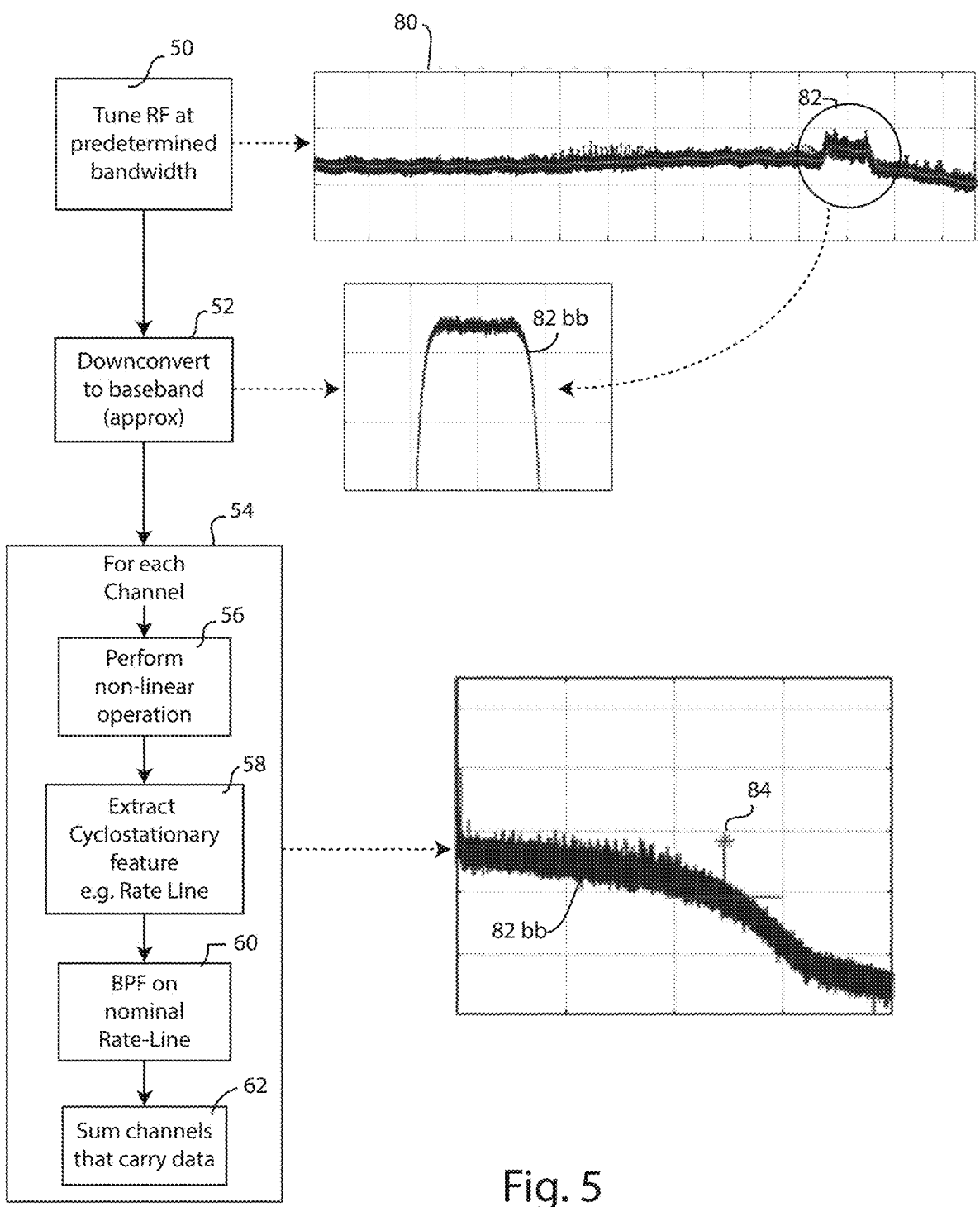
FIG. 5 depicts various exemplary waveforms corresponding to selected processing blocks from the flow chart of FIG. 4.

FIG. 5 shows some of the exemplary signals occurring at various steps of the disclosed signal processing method of FIG. 4. These steps also generally follow the operation of the embodiment of FIG. 3, as those steps would pertain to processing of a single satellite transmission captured by antenna 31.

As at step 60, when the received RF signal is captured by antenna 31 and filtered by BPF 34, the exemplary S band signal appears as shown at 90, with the transmission signal of interest shown at 92. At step 62 once the signal is down-converted to baseband, the signal of interest appears as shown at 92 *bb*.

Then for each channel (of a channelized transmission), the steps at 64 are performed to extract from the baseband signal a rate-line signal 94. The steps at 64 include performing the non-linear operation 66 and extracting the cyclostationary feature at 68 (rate-line 94).

Additional Rate-Line Discrimination Embodiments

In the first described embodiment a phase-locked loop (PLL) technique was used for rate-line discrimination. There are other potentially more robust techniques for performing rate-line discrimination. Some of these techniques will now be discussed. These additional techniques may be adapted for use in the signal processing system of FIG. 3, as illustrated with reference to FIG. 6.

Figure 6:
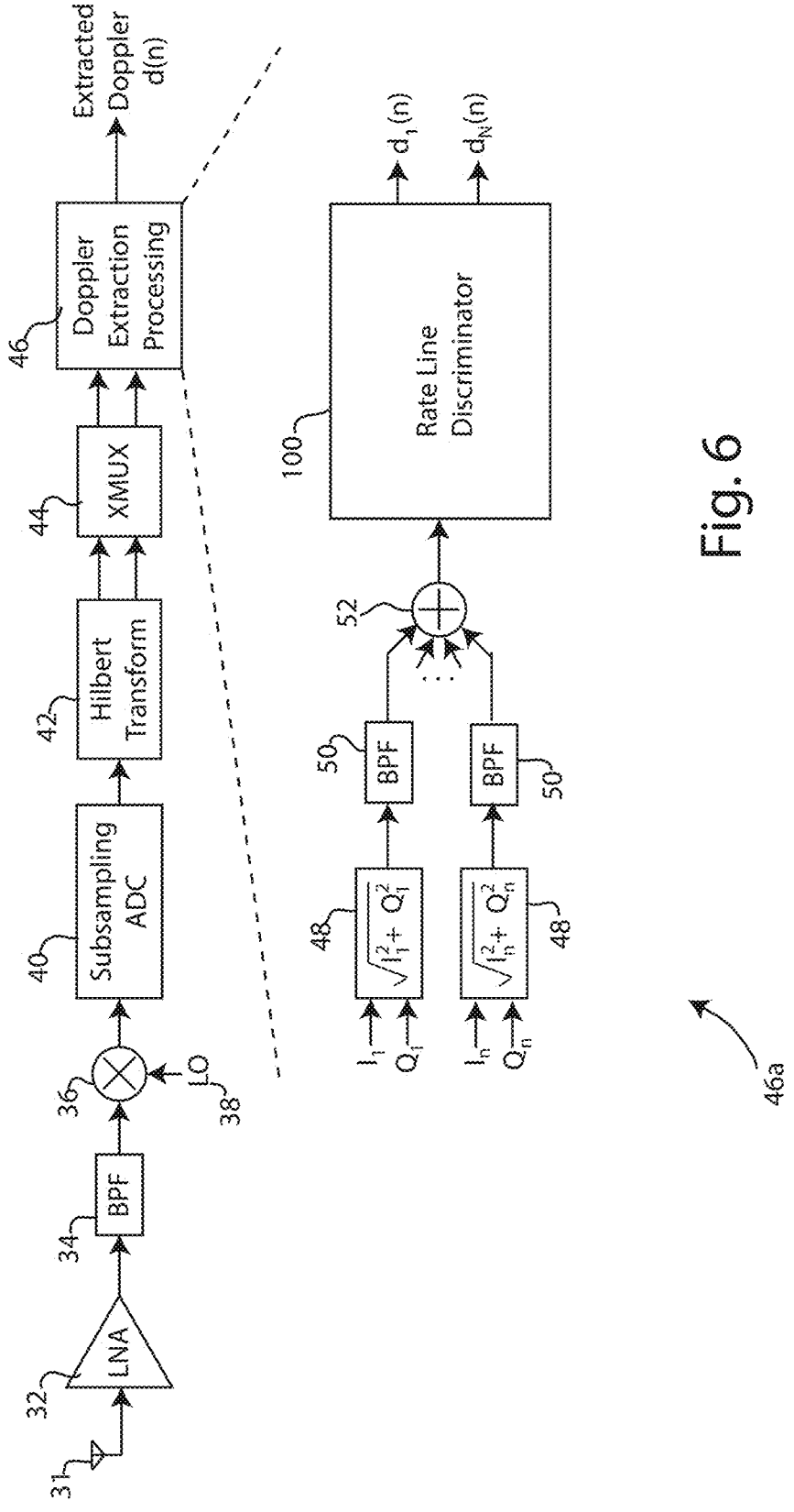
FIG. 6 is a block diagram illustrating an exemplary embodiment of the signal processing technique based on a rate-line discriminator processor, useful for processing channelized signals from a plurality of satellites.

In FIG. 6, the phase-locked loop (PLL) portion of the system has been replaced by the rate-line discriminator 100. Two embodiments for implementing this rate-line discriminator will now be presented.

Narrow-Band Digital Receiver Bank

Figure 7:
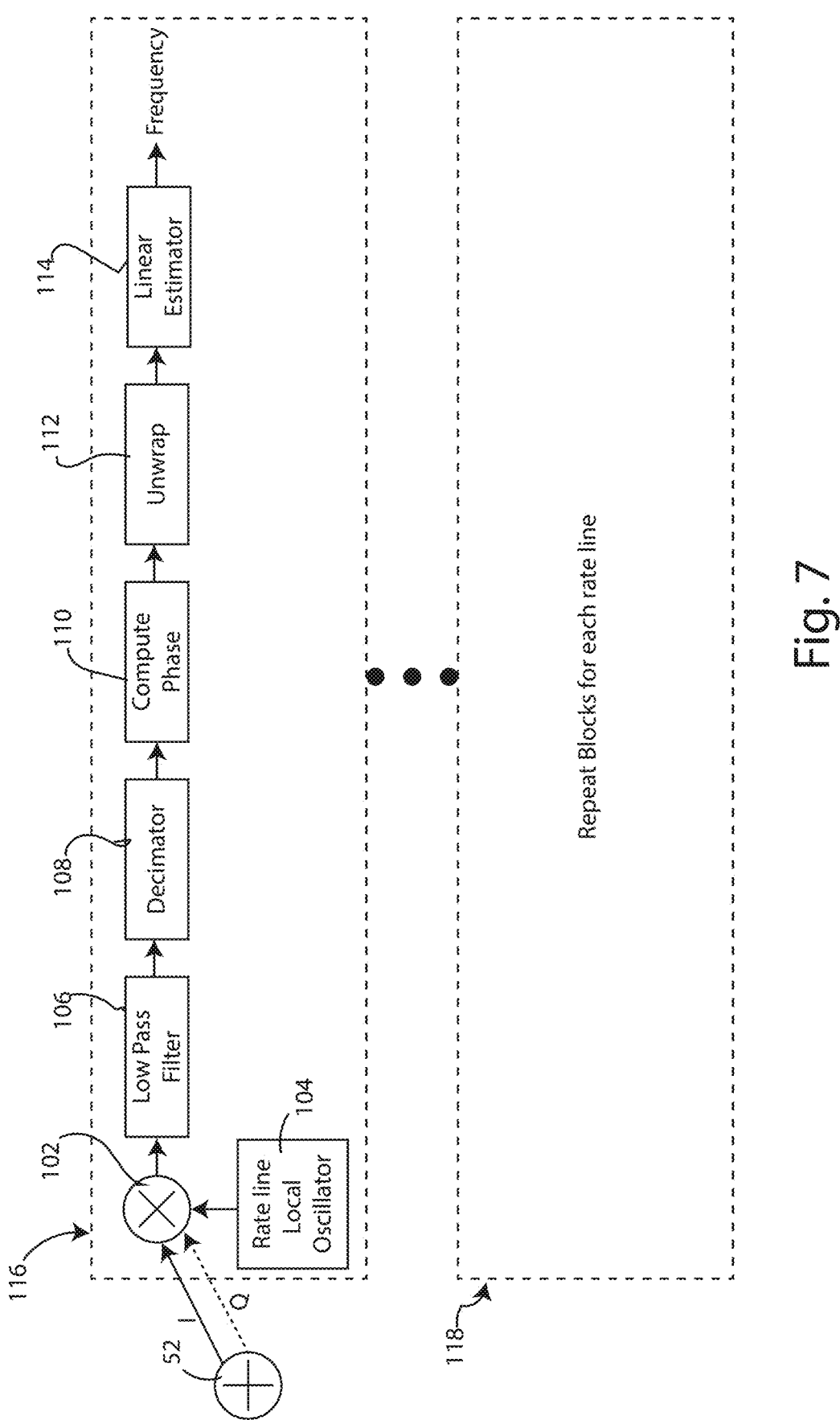
FIG. 7 is a bank-of-receivers embodiment of rate-line discriminator processor, which may be used as a component in the block diagram of FIG. 6.

As illustrated in FIG. 7, the rate-line discriminator 100 (FIG. 6) may be implemented as a bank of narrow-band digital receivers, each tuned to a different rate-line The phase of the rate-line is measured, unwrapped and used to feed a linear estimator of frequency which performs near theoretical limits of frequency estimators with rate-line SNR above 6 dB.

Referring to FIG. 7, the I and Q phase signals from summer 52 (e.g., from FIG. 6) are fed to a mixer 102, which is also receptive of a signal from local oscillator 104. The local oscillator is configured to produce a signal at the rate-line frequency that is desired to be detected. Mixing at 102 produces for both I and Q signals a pair of corresponding sum and difference signals as the mathematical byproduct of mixing (sine wave multiplication). The mixer and local oscillator combination is, in effect, a tuner which produces I and Q output signals when a rate-line tone of the desired frequency is present, and no output when a different tone or only noise is present.

The output of the mixer is passed through low pass filter 106, which passes the difference signals of the I and Q inputs while blocking or discarding the sum signals. Thus, by this filtration technique only one signal for each of the I and Q inputs remains. Any spurious signals produced by unwanted rate-line tones and noise are rejected. The I and Q data are then processed through a decimator at 108, which down-samples the data for more convenient signal processing. The signal processor then computes the phase of the I and Q data. However, because of the cyclic nature of phase data, one cannot be sure that the phase values represent the original phase values, or multiples of a thereof. To address this, the phase signals are processed through an unwrapping algorithm, which reconstructs the signals' original phases. A suitable algorithm for performing unwrapping is implemented in MATLAB®, as discussed in M. Gdeisat et al, *One-Dimensional Phase Unwrapping Problem.*

In order to construct a rate-line discriminator that can identify a plurality of different rate-lines, the narrow-band digital receiver 116, discussed above, is duplicated for each different rate line of interest, as illustrated at 118.

Multiple Signal Classification (MUSIC) Algorithm

Figure 8:
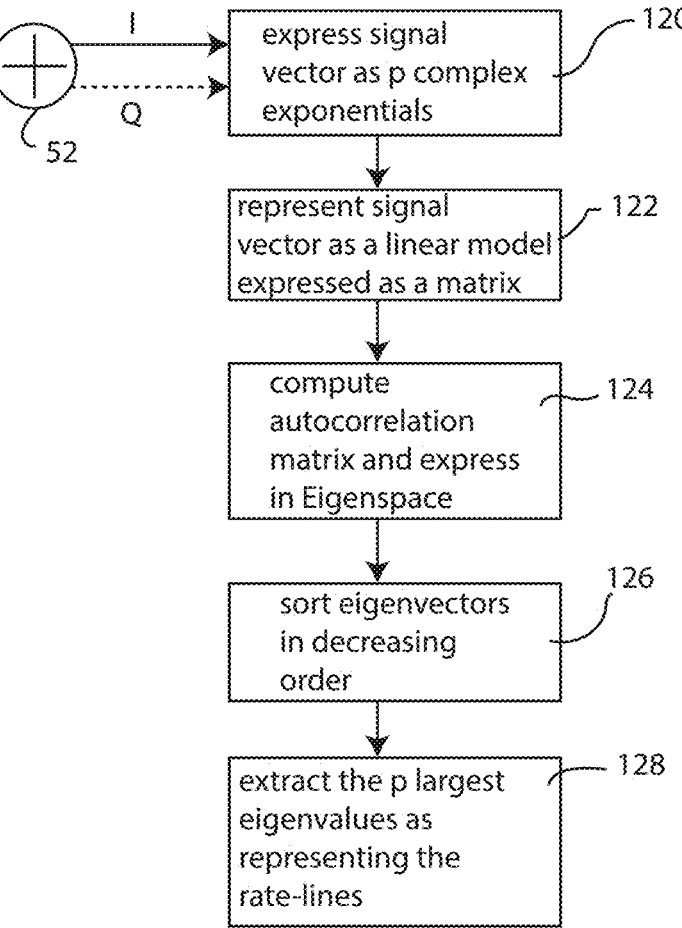
FIG. 8 is a MUSIC algorithm embodiment of rate-line discriminator processor, which may be used as a component in the block diagram of FIG. 6.

Another alternative implementation of the rate-line discriminator 100 (FIG. 6) uses a processor programmed to perform the multiple signal classification (MUSIC) algorithm. This is illustrated diagrammatically in the flowchart of FIG. 8. In FIG. 8, the I and Q phases from the summer 52 (FIG. 6) are digitized and supplied as inputs to the processor programmed to implement the MUSIC algorithm. As illustrated at step 120 the input I and Q data are expressed as vectors using a predefined number p of complex exponentials whose frequencies are unknown. The signal data is assumed to be in the presence of noise.

Next at step 122, the vector representations are represented as a linear model expressed as a matrix. Specifically the model employs a Vandermonde matrix A of steering vectors a(w) and an amplitude vector s. Key to this model is that the number of sources p is less than the number of elements in the matrix. x=As+n, where n is the noise.

At step 124 the processor computes the M×M autocorrelation matrix R of x, which is expressed in Eigenspace. The eigenvectors are sorted in step 126 in decreasing order, and in step 128 the p largest eigenvalues are extracted as correspond to the signals of largest variability and thus the span of the signal subspace—i.e. these represent the rate-lines. The remaining eigenvectors correspond to the span of the noise subspace and are discarded.

Implementing the Doppler Tracking Receiver

In a Doppler tracking receiver implementation, the rate-line frequency of the satellite system must be known accurately. For some satellite systems this is not a problem because the rate-line is derived from an accurate and globally known frequency reference, e.g. a rubidium clock synchronized with the GPS system. For systems that the rate-line frequency is not well known it must be estimated or otherwise accounted for.

One method of estimation is to use receivers with known location to measure the rate-lines and using their known location and satellite position and velocity can compute the expected doppler shift on the signals to compute the rate line frequency at the satellite. This information is sent to other receivers with unknown location. Depending upon the stability of the rate-line frequency periodic updates are required for optimal accuracy. Block 30 (FIG. 2) requires estimates of the errors in satellite position and velocity and rate-line frequency(ies) to correctly provide navigation or timing services. Block 30 (FIG. 2) may be implemented as a Kalman Filter or in an alternate embodiment by a maximum likelihood estimate process.

Figure 9:
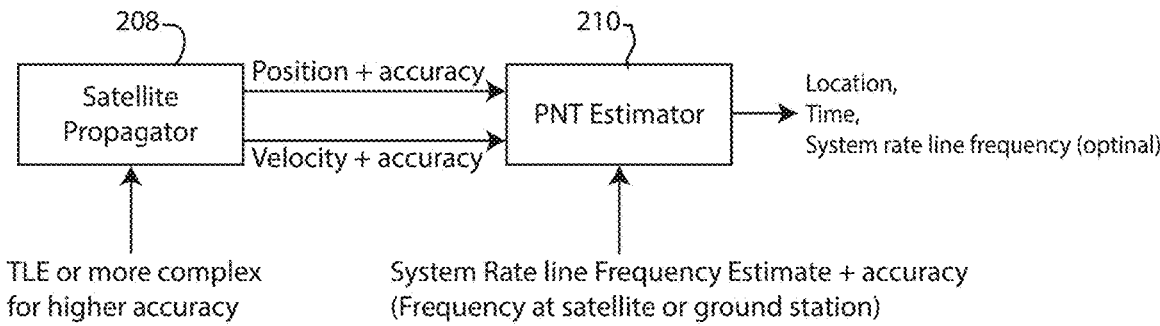
FIG. 9 is a first embodiment of a Doppler tracking receiver according to the disclosed rate-line detection technique.

FIG. 9 illustrates one embodiment of a Doppler tracking receiver according to the disclosed rate-line detection technique where the satellite propagator 208 receives TLE information, or more complex information from a system such as illustrated in FIG. 10 for greater accuracy. The propagator 208 supplies position plus accuracy information, and velocity plus accuracy information to the positioning, navigation, and timing services (PNT) estimator 210. This estimator 210 provides the services that were illustrated diagrammatically at 16 in FIG. 1. In this embodiment the PNT estimator 210 is supplied with system rate-line frequency estimate, plus accuracy. This system rate-line frequency estimate may be obtained by processing, as described above, at either the satellite or a ground station. The PNT estimator 210 outputs location and time information and may be configured to optionally supply the system rate-line frequency.

Figure 11:
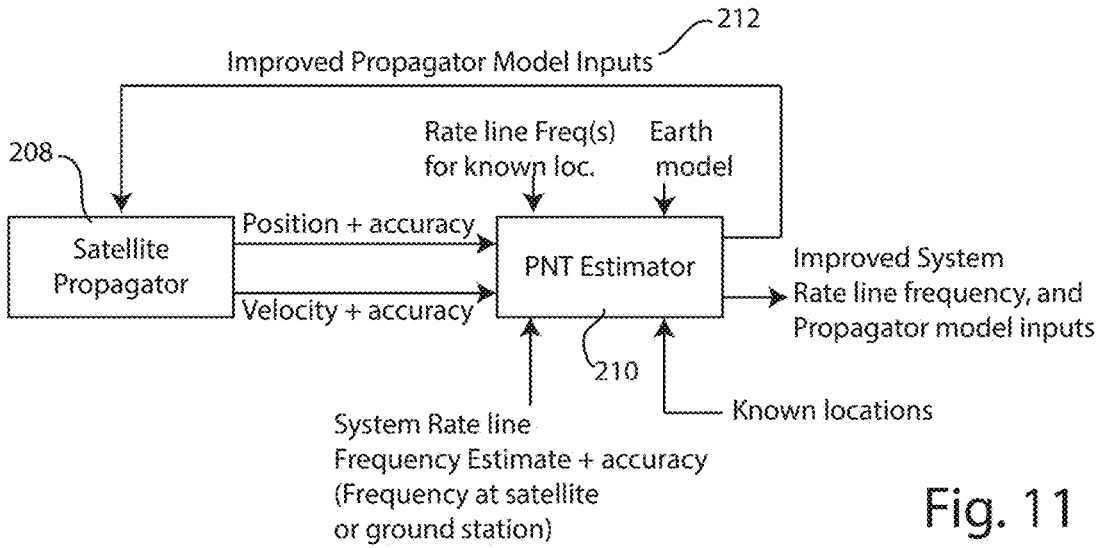
FIG. 11 is a second embodiment of a Doppler tracking receiver according to the disclosed rate-line detection technique.

A more sophisticated embodiment of a Doppler tracking receiver is shown in FIG. 11. The satellite propagator 208 provides position plus accuracy information, and velocity plus accuracy information to the PNT estimator 210, as with the embodiment of FIG. 9. However, the PNT estimator 210 is configured to receive and process an enhanced set of data:

System rate line frequency estimate plus accuracy, extracted from frequency at the satellite or at a ground station;

Rate line frequencies for known locations;

The Earth model, e.g. from sources 202 (FIG. 10);

Other known locations

The PNT estimator 201 of FIG. 11 thus outputs an improved system rate-line frequency along with propagator model inputs.

In the embodiment of FIG. 11, the improved propagator model inputs are supplied, as at 212, as feedback to the satellite propagator 208, which uses these as its inputs.

While several exemplary embodiments have been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment without departing from the scope of the invention as set forth in the appended claims.

What is claimed is:

1. A Doppler tracking receiver comprising:

an antenna port for capturing an electromagnetic transmission carrying a bauded signal from a transmitter carried by a satellite that is in motion relative to the tracking receiver;

a processor configured to perform a non-linear operation on the captured transmission to expose a cyclostationary feature of the captured transmission that defines a rate-line having a rate-line frequency that is related to the bauded signal and to the motion of the transmitter relative to the receiver;

a circuit that detects the rate-line frequency and generates Doppler shift data indicative of the Doppler shift associated with the satellite in motion;

a satellite propagator supplying at least one of position and velocity information of the satellite; and an estimator receptive of the at least one of position and velocity information from the propagator and further receptive of the Doppler shift data, the estimator computing at least one of positioning, navigation and timing information for the satellite supplied as the output of the receiver.

2. The receiver of claim 1 further comprising a downconverter to convert the captured transmission to a lower frequency.

3. The receiver of claim 2 wherein the downconverter includes a mixer and local oscillator.

4. The receiver of claim 2 wherein the downconverter is implemented as a process in the digital domain.

5. The receiver of claim 1 further comprising a signal transformation processor that generates based on the captured transmission a first signal at a first phase angle and a second signal at a second phase angle and wherein the processor is configured to perform a non-linear operation on the first and second signals.

6. The receiver of claim 5 wherein the signal transformation processor performs a Hilbert transformation.

7. The receiver of claim 1 wherein the electromagnetic transmission is channelized into a plurality of time-aligned signals and the receiver further comprises a transmultiplexer to extract a plurality of time-aligned signals, one for each channel.

8. The receiver of claim 7 wherein the processor performs the non-linear operation on each of the plurality of time-aligned signals to produce plural rate-lines each having a rate-line frequency.

9. The receiver of claim 8 further comprising a circuit that sums the plurality of time-aligned signals to produce a composite rate-line signal having a rate-line frequency.

10. The receiver of claim 8 wherein the circuit that detects the rate-line frequency includes a phase-locked loop for each of the plural rate-lines.

11. The receiver of claim 1 wherein the circuit that detects the rate-line frequency includes a phase-locked loop.

12. The receiver of claim 1 wherein the circuit that detects the rate-line frequency employs a rate-line discriminator.

13. The receiver of claim 12 wherein the rate-line discriminator employs at least one receiver that is tuned to receive a predetermined frequency corresponding to a predetermined rate-line.

14. The receiver of claim 12 wherein the rate-line discriminator comprises a circuit that unwraps a computed phase angle extracted from the exposed cyclostationary feature and performs a linear estimation.

15. The receiver of claim 12 wherein the rate-line discriminator comprises a processor programmed to apply a multiple signal classification algorithm to the exposed cyclostationary feature to extract at least one rate-line therefrom.

16. The receiver of claim 1 further comprising an information feedback path by which the estimator supplies an input to the propagator.

17. The receiver of claim 1 wherein the estimator receives the at least one of position and velocity information from a source that supplies information selected from the group consisting of: polar motion, Coriolis acceleration, solar radiation pressure, sun gravity model, moon gravity model, earth gravity model, solid earth tide, and combinations thereof.

18. A Doppler tracking receiver comprising:

an antenna port for capturing an electromagnetic transmission carrying a bauded signal from a transmitter carried by a satellite that is in motion relative to the tracking receiver; and a signal processing system having digital circuits programed to execute the following process:

perform a non-linear operation on the captured transmission to expose a cyclostationary feature of the captured transmission that defines a rate-line having a rate-line frequency that is related to the bauded signal and to the motion of the transmitter relative to the receiver;

detect the rate-line frequency and generate Doppler shift data indicative of the Doppler shift associated with the satellite in motion;

acquire the Doppler shift data and at least one of position and velocity information of the satellite supplied by a satellite propagator; and compute at least one of positioning, navigation and timing information for the satellite supplied as the output of the receiver.

19. The receiver of claim 18 wherein a digital processing circuit is programmed to detect the rate-line frequency using a rate-line discriminator.

20. A method for processing signals from a satellite transmitter that is in motion relative to a tracking receiver, the method comprising:

capturing an electromagnetic transmission carrying a bauded signal from the satellite transmitter with the tracking receiver;

performing a non-linear operation on the captured transmission to expose a cyclostationary feature of the captured transmission that defines a rate-line having a rate-line frequency that is related to the bauded signal and to the motion of the satellite transmitter relative to the tracking receiver;

detecting the rate-line frequency and generating Doppler shift data indicative of the Doppler shift associated with the satellite transmitter in motion;

acquiring at least one of position and velocity information of the satellite from a satellite propagator; and computing at least one of positioning, navigation and timing information for the satellite based on the Doppler shift data and the at least one of position and velocity information of the satellite.

* * * * *